(12) United States Patent
Takemura

(10) Patent No.: US 10,875,546 B2
(45) Date of Patent: Dec. 29, 2020

(54) CONTROL METHOD AND CONTROL DEVICE FOR CONTROLLING NOTIFICATION

(71) Applicant: PANASONIC INTELLECTUAL PROPERTY MANAGEMENT CO., LTD., Osaka (JP)

(72) Inventor: Hiroshi Takemura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/739,758

(22) Filed: Jan. 10, 2020

(65) Prior Publication Data

US 2020/0148227 A1 May 14, 2020

Related U.S. Application Data

(63) Continuation of application No. PCT/JP2018/026357, filed on Jul. 12, 2018.

(30) Foreign Application Priority Data

Jul. 13, 2017 (JP) ................................. 2017-137358

(51) Int. Cl.
  *G08B 23/00* (2006.01)
  *B60W 50/14* (2020.01)
  (Continued)

(52) U.S. Cl.
  CPC ............ *B60W 50/14* (2013.01); *B60W 40/04* (2013.01); *B60W 50/085* (2013.01); *G06K 9/00805* (2013.01)

(58) Field of Classification Search
  CPC .... B60W 50/14; B60W 40/04; B60W 50/085; B60W 30/09; B60W 2050/143;
  (Continued)

(56) References Cited

U.S. PATENT DOCUMENTS

2019/0344791 A1* 11/2019 Kim ...................... B60W 30/17
2020/0216068 A1* 7/2020 Tashiro ............... B60W 30/146

FOREIGN PATENT DOCUMENTS

JP 2013-082382 5/2013

OTHER PUBLICATIONS

International Search Report (ISR) issued in International Pat. Appl. No. PCT/JP2018/026357, dated Oct. 16, 2018.

* cited by examiner

*Primary Examiner* — Toan N Pham
(74) *Attorney, Agent, or Firm* — Greenblum & Bernstein, P.L.C.

(57) ABSTRACT

A first acquisition unit of a control device mounted on a vehicle acquires first traveling information at least including position information on a host vehicle. A second acquisition unit acquires second traveling information at least including traveling track information on a vehicle ahead when braking occurs in the vehicle ahead. A determination unit determines a threshold value based on the second traveling information acquired by the second acquisition unit and the first traveling information acquired by the first acquisition unit. An output unit gives a notification of braking in the vehicle ahead in accordance with a relationship between a distance and the threshold value determined by the determination unit, the distance being defined between the traveling track information in the second traveling information acquired by the second acquisition unit and the position information in the first traveling information acquired by the first acquisition unit.

10 Claims, 8 Drawing Sheets

(51) Int. Cl.
*B60W 40/04* (2006.01)
*B60W 50/08* (2020.01)
*G06K 9/00* (2006.01)

(58) Field of Classification Search
CPC .. B60W 2556/65; B60W 30/08; B60W 30/17;
G06K 9/00805; G08G 1/16; B60Q 9/008;
B60Q 1/525
See application file for complete search history.

76

CONTROL METHOD AND CONTROL DEVICE FOR CONTROLLING NOTIFICATION

BACKGROUND

1. Field

The present disclosure relates to control technology and, more particularly, to a control method and a control device for controlling notifications.

2. Description of the Related Art

There is a requirement to detect a crash stop maneuver in a further vehicle traveling in front of the driver's vehicle to avoid a danger for the driver of the driver's vehicle. When a crash stop maneuver is performed in the further vehicle, the further vehicle transmits information on the further vehicle using vehicle-to-vehicle communication. When the driver's vehicle receives the information on the further vehicle, the driver's vehicle executes danger avoidance support to avoid a danger for the vehicle (see, for example, patent literature 1).
[patent literature 1] JP2013-82382

Using vehicle-to-vehicle communication gives the driver's vehicle an early notification of crash stop of the further vehicle traveling in front and so can alert the driver of the driver's vehicle. When crash stop of the further vehicle traveling in front does not affect the driver's vehicle, however, notification of crash stop of the further vehicle is unnecessary for the driver of the driver's vehicle.

SUMMARY

The present disclosure addresses the above-described issue, and a purpose thereof is to provide a technology capable of inhibiting occurrence of unnecessary notifications of stop of a further vehicle.

A control device according to an embodiment of the present disclosure can be mounted on a vehicle and includes: a first acquisition unit that acquires first traveling information at least including position information on a host vehicle; a second acquisition unit that acquires second traveling information at least including traveling track information on a further vehicle when braking occurs in the further vehicle; a determination unit that determines a threshold value based on the second traveling information acquired by the second acquisition unit and the first traveling information acquired by the first acquisition unit; and an output unit that gives a notification of braking in the further vehicle in accordance with a relationship between a distance and the threshold value determined by the determination unit, the distance being defined between the traveling track information in the second traveling information acquired by the second acquisition unit and the position information in the first traveling information acquired by the first acquisition unit.

Another embodiment of the present disclosure relates to a control method. The is adapted to a control device that can be mounted on a vehicle and includes: acquiring first traveling information at least including position information on a host vehicle; acquiring second traveling information at least including traveling track information on a further vehicle when braking occurs in the further vehicle; determining a threshold value based on the second traveling information acquired and the first traveling information acquired; and giving a notification of braking in the further vehicle in accordance with a relationship between a distance and the threshold value determined, the distance being defined between the traveling track information in the second traveling information acquired and the position information in the first traveling information acquired.

Optional combinations of the aforementioned constituting elements, and implementations of the disclosure in the form of methods, apparatuses, systems, recording mediums, and computer programs may also be practiced as additional modes of the present disclosure.

BRIEF DESCRIPTION

Embodiments will now be described by way of examples only, with reference to the accompanying drawings which are meant to be exemplary, not limiting and wherein like elements are numbered alike in several Figures in which:

FIGS. 1A, 1B, and 1C show an operation of a notification system according to a comparative embodiment;

DETAILED DESCRIPTION

Figure 1:
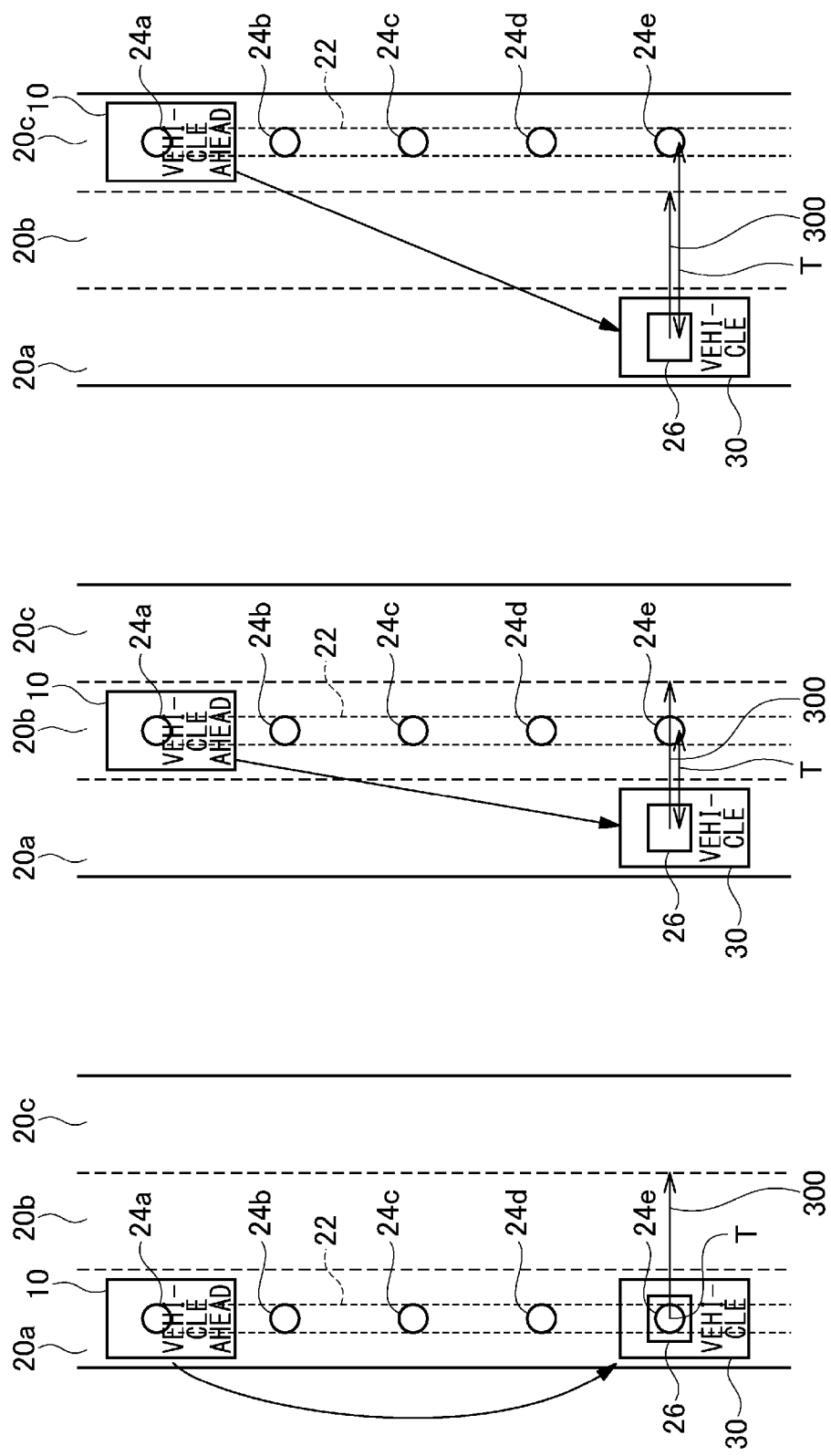

The invention will now be described by reference to the preferred embodiments. This does not intend to limit the scope of the present invention, but to exemplify the invention.

A brief summary will be given before describing the present disclosure in specific details. An embodiment of the present disclosure relates to a control device mounted on a vehicle and adapted to notify the driver of the host vehicle (driver's vehicle) of a stop of a further vehicle traveling in front (hereinafter, referred to as "vehicle ahead"). Notification of stop may be given only in the case of crash stop or emergency stop. Crash stop or emergency stop may also be referred to as sudden braking or short-distance braking and means stopping a vehicle in a short distance in order to avoid an accident. The control device mounted on the vehicle ahead uses vehicle-to-vehicle communication to periodically transmit current position information and information showing a track of vehicle traveling over 200-300 m as far as the current position (hereinafter, referred to as "traveling track information"). The traveling track information indicates, for example, position information at a predetermined interval in the track in which the vehicle ahead has traveled. When the vehicle ahead is braked, the control device includes information indicating that braking is performed in addition to the current position information and the traveling track information and transmits the resultant information using vehicle-to-vehicle communication. These items of information are received by the control device of the host vehicle.

The control device of the host vehicle performs electric emergency brake lights (EEBL). In EEBL, the control derive derives a distance that occurs at a point where the traveling track information on the vehicle ahead and the current position of the host vehicle are closest. When the distance is equal to less than a threshold value, the control device notifies the driver of the host vehicle of braking in the vehicle ahead. The threshold covers a lane (hereinafter, referred to as "adjacent lane") adjacent to a lane (hereinafter, referred to as "driving lane") on which the host vehicle is traveling. It can therefore be said that EEBL provides notification of braking in the vehicle ahead that has traveled on the driving lane or the adjacent lane.

If the driving lane and the adjacent lane remain running adjacent to each other, braking in the vehicle ahead affects the host vehicle so that a notification of braking by EEBL alerts the driver of the host vehicle. In the case the driving lane and the adjacent lane branch from each other in the direction of travel of the host vehicle (at the destination of travel), braking in the vehicle ahead traveling in the adjacent lane does not affect the host vehicle so that an EEBL notification of braking can be said to be an unnecessary notification for the driver of the host vehicle. Occurrence of an unnecessary notification like this makes the driver's attention less attracted when a necessary notification occurs. It is therefore desired to inhibit occurrence of unnecessary notifications.

The control device according to the embodiment sets the first threshold value when the distance between the position information on the host vehicle and the position information on the vehicle ahead is within a predetermined range. When the distance is longer than the predetermined range, the control device sets the second threshold value. The second threshold value is defined to be shorter than the first threshold value. More specifically, the first threshold value covers the adjacent lane as in the case of the related-art threshold value, but the second threshold value only covers the driving lane. In other words, the threshold value that covers the adjacent lane is set when the distance between the position information on the vehicle ahead maneuvered to stop and the current position information on the host vehicle is close. When the distance is long, the threshold that only covers the driving lane is set.

FIGS. 1A-1C show an operation of a notification system 200 according to a comparative embodiment. The illustrated operation represents a related-art basic EEBL operation. The notification system 200 includes a vehicle ahead 10 and a vehicle 30. Referring to FIGS. 1A-1C, a first lane 20a, a second lane 20b, and a third lane 20c, which are generically referred to as lanes 20, are arranged. The first lane 20a, the second lane 20b, and the third lane 20c extend longitudinally and have a traveling orientation defined from bottom to top. Since the vehicle 30 travels on the first lane 20a, the first lane 20a represents the driving lane, and the second lane 20b represents the adjacent lane.

Referring to FIG. 1A, the vehicle ahead 10 is traveling on the first lane 20a so that a traveling track 22 is also located on the first lane 20a. The vehicle ahead 10 is a vehicle having a traveling orientation identical to that of the vehicle 30 and traveling in front of the vehicle 30. The control device (not shown) mounted on the vehicle ahead 10 discretely acquires position information 24 on the traveling track 22. The position information 24 is shown as first position information 24a, . . . , fifth position information 24e. By defining a wide interval from given position information to adjacent position information when the lane traveled is straight and defining a small interval when the lane traveled is curved, the traveling track of the vehicle ahead 10 will accurately reflect the shape of the lane (road) traveled. The control device periodically (e.g., at every 100 msec) uses vehicle-to-vehicle communication to transmit the first position information 24a that is the current position information and the traveling track information including the second position information 24b through the fifth position information 24e that extend 200-300 m from the first position information 24a. Vehicle-to-vehicle communication is defined in a communication system such as intelligent transport systems (ITS). A publicly known technology may be used so that a description thereof is omitted. It is assumed that the vehicle ahead 10 is maneuvered to stop at the position of the first position information 24a. Upon detection of braking, the control device of the vehicle ahead 10 uses vehicle-to-vehicle communication to transmit information (braking information) indicating that the vehicle ahead is braked in addition to the first position information 24a that is the current position information and the traveling track information including the second position information 24b through the fifth position information 24e that extend 200-300 m from the first position information 24a.

The control device (not shown) mounted on the vehicle 30 uses vehicle-to-vehicle communication to receive the first position information 24a, the traveling track information, and the braking information from the vehicle ahead 10. The control device acquires position information 26 on the vehicle 30. Denoting the position information on the vehicle 30 as "first traveling information", the first position information 24a, the traveling track information, and the braking information on the vehicle ahead 10 will be denoted as "second traveling information". Of the plurality of pieces of position information 24 included in the traveling track information, the control device extracts the fifth position information 24e closest to the position information 26 and the adjacent fourth position information 24d. The control device also calculates the minimum distance (distance T) from the position information 26 to the straight line connecting the fifth position information 24e and the fourth position information 24d. The control device also maintains a threshold value 300 corresponding to the width including the traveling lane and the adjacent lane. The threshold value 300 is defined in a rightward orientation from the vehicle 30 but is also be defined in a leftward orientation. Since the calculated distance T is equal to or smaller than the threshold value 300, the control device notifies the driver of the vehicle 30 of braking in the vehicle ahead 10.

Referring to FIG. 1B, the vehicle ahead 10 is traveling on the second lane 20b so that the traveling track 22 is also located on the second lane 20b. The vehicle ahead 10 is braked at the position of the first position information 24a. Upon detection of braking in the vehicle ahead 10, the control device mounted on the vehicle ahead 10 uses vehicle-to-vehicle communication to transmit the first position information 24a indicating the position occurring at the time of braking, the traveling track information, and the braking information. The control device mounted on the vehicle 30 uses vehicle-to-vehicle communication to receive the first position information 24a, the traveling track information, and the braking information from the vehicle ahead 10. Of the plurality of pieces of position information 24 included in the traveling track information, the control device extracts the fifth position information 24e closest to the position information 26 and the adjacent fourth position information 24d. The control device also calculates the minimum distance (distance T) from the position information 26 to the straight line connecting the fifth position information 24e and the fourth position information 24d. Since the calculated distance T is equal to or smaller than the threshold value 300, the control device notifies the driver of the vehicle 30 of braking in the vehicle ahead 10.

Referring to FIG. 1C, the vehicle ahead 10 is traveling on the third lane 20c so that the traveling track 22 is also located on the third lane 20c. The vehicle ahead 10 is braked at the position of the first position information 24a. Upon detection of braking in the vehicle ahead 10, the control device mounted on the vehicle ahead 10 uses vehicle-to-vehicle communication to transmit the first position information 24a indicating the position occurring at the time of braking, the traveling track information, and the braking information. The control device mounted on the vehicle 30 uses vehicle-to-vehicle communication to receive the first position information 24a, the traveling track information, and the braking information from the vehicle ahead 10. Of the plurality of pieces of position information 24 included in the traveling track information, the control device extracts the fifth position information 24e closest to the position information 26 and the adjacent fourth position information 24d. The control device also calculates the minimum distance (distance T) from the position information 26 to the straight line connecting the fifth position information 24e and the fourth position information 24d. Since the calculated distance T is longer than the threshold value 300, the control device does not notify the driver of the vehicle 30 of braking in the vehicle ahead 10. In other words, the driver of the vehicle 30 is notified of braking in the vehicle ahead 10 traveling on the driving lane or the adjacent lane, but the driver of the vehicle 30 is not notified of braking in the vehicle ahead 10 traveling on another lane 20.

Figure 2:
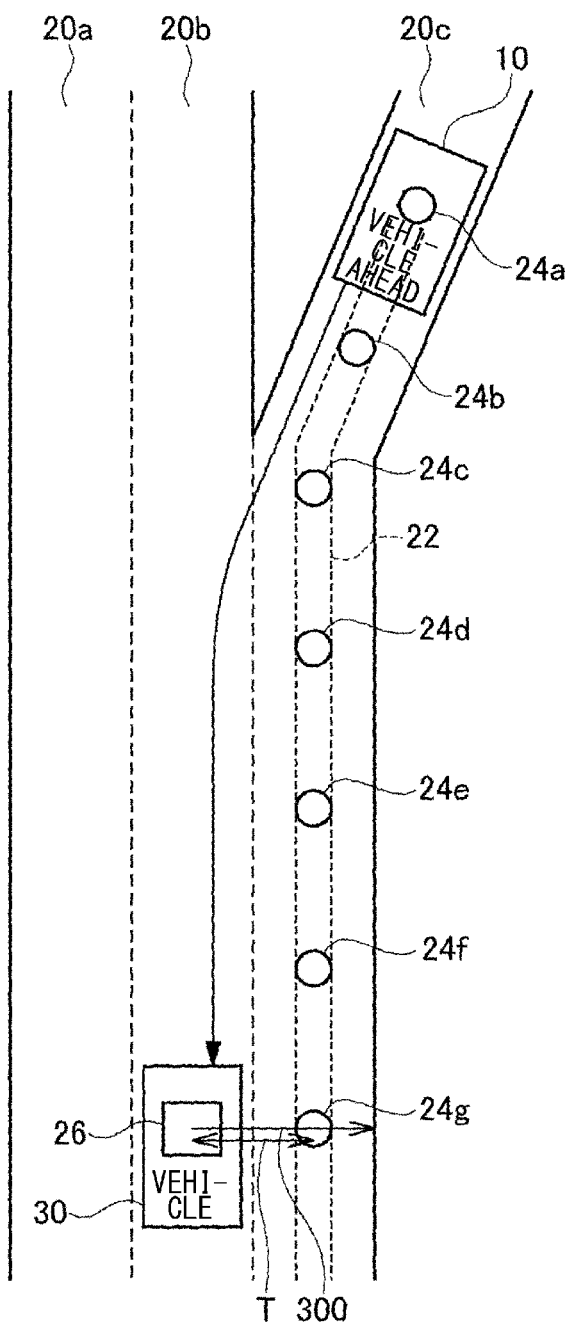
FIG. 2 shows an operation of the notification system of FIGS. 1A-1C.

FIG. 2 shows an operation of the notification system 200. The illustrated operation corresponds to the basic operation in the related-art EEBL, but the shape of the road is different from that of FIGS. 1A-1C. The first lane 20a and the second lane 20b extend longitudinally, but the third lane 20c deviates rightward toward the top of the figure. The first lane 20a through the third lane 20c run from bottom to top. Since the vehicle 30 travels on the second lane 20b, the second lane 20b represents the driving lane, and the first lane 20a and the third lane 20c represent the adjacent lane.

The vehicle ahead 10 is traveling on the third lane 20c so that the traveling track 22 is also located on the third lane 20c. The vehicle ahead 10 is braked at the position of the first position information 24a deviated rightward from the second lane 20b. Upon detection of braking in the vehicle ahead 10, the control device uses vehicle-to-vehicle communication to transmit the first position information 24a indicating the position occurring at the time of braking, the traveling track information including the second position information 24b through the seventh position information 24g that extend 200-300 m from the first position information 24a, and the braking information.

The control device mounted on the vehicle 30 uses vehicle-to-vehicle communication to receive the first position information 24a, the traveling track information, and the braking information from the vehicle ahead 10. Of the plurality of pieces of position information 24 included in the traveling track information, the control device extracts the seventh position information 24g closest to the position information 26 and the adjacent sixth position information 24f. The control device also calculates the minimum distance (distance T) from the position information 26 to the straight line connecting the seventh position information 24g and the sixth position information 24f. Since the calculated distance T is equal to or smaller than the threshold value 300, the control device does not notify the driver of the vehicle 30 of braking in the vehicle ahead 10. However, the first position information 24a where braking occurs in the vehicle ahead 10 is located in a branch deviated from the second lane 20b on which the vehicle 30 is traveling. Therefore, braking in the vehicle ahead 10 does not affect the vehicle 30 if the vehicle 30 continues to travel on the second lane 20b. Therefore, a notification given to the driver of the vehicle 30 of braking in the vehicle ahead 10 in the situation as shown in FIG. 2 can be said to be an unnecessary notification.

Figure 3:
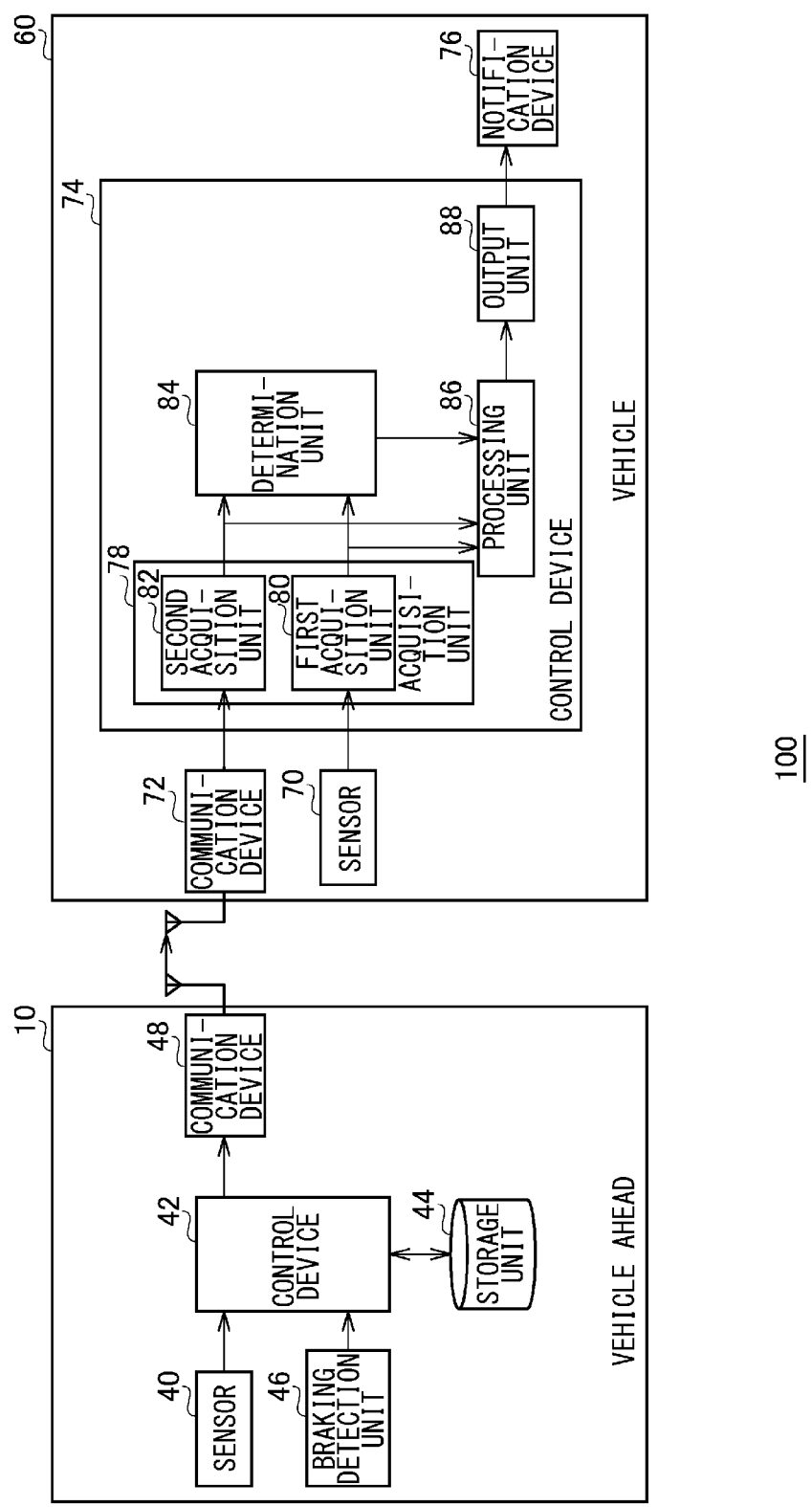
FIG. 3 shows a configuration of a notification system according to the embodiment.

FIG. 3 shows a configuration of a notification system 100 according to the embodiment. The notification system 100 includes the vehicle ahead 10 and a vehicle 60. The vehicle ahead 10 is as described above, but the system includes the vehicle 60 in place of the vehicle 30 of FIGS. 1A-1C and FIG. 2. The vehicle ahead 10 includes a sensor 40, a control device 42, a storage unit 44, a braking detection unit 46, and a communication device 48. The vehicle 60 includes a sensor 70, a communication device 72, a control device 74, and a notification device 76. The control device 74 includes an acquisition unit 78, a determination unit 84, a processing unit 86, and an output unit 88. The acquisition unit 78 includes a first acquisition unit 80 and a second acquisition unit 82.

The sensor 40 in the vehicle ahead 10 detects position information on the vehicle ahead 10. The position information is given by, for example, a longitude and a latitude. For example, the sensor 40 performs satellite positioning based on a signal received from a Global Navigation Satellite System (GNSS) satellite. The sensor 40 may perform positioning based on autonomous navigation or may perform a combination of satellite positioning and autonomous navigation. The sensor 40 also detects the orientation (hereinafter, referred to as "traveling orientation") in which the vehicle ahead 10 travels. The sensor 40 also detects the yaw rate of the vehicle ahead 10 and the altitude of the vehicle ahead 10. For these detections, a publicly known technology may be used, and a description thereof is omitted. The detections are performed periodically either at a predetermined interval or for a predetermined duration. The sensor 40 may be comprised of a plurality of devices. The sensor 40 outputs the detected information to the control device 42.

The control device 42 causes the storage unit 44 to store the information received from the sensor 40. The storage unit 44 need not store all information and may store at least the position information and the time of acquisition of the position information. The storage unit 44 stores the information in accordance with an instruction from the control device 42. The braking detection unit 46 detects braking in the vehicle ahead 10 and, in particular, crash braking or emergency braking. The detection is made when the speed of stepping on the brake pedal is higher than a predetermined value or when the speed of the vehicle ahead 10 is decelerated faster than a predetermined value. A publicly known technology may be used for the braking detection unit 46. When braking is detected, the braking detection unit 46 notifies the control device 42 of the detection.

Figure 4:
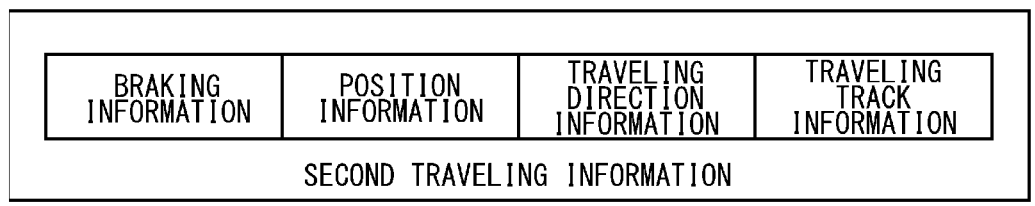
FIG. 4 shows a data structure of the second traveling information transmitted from the vehicle ahead of FIG. 3.

The control device 42 generates the second traveling information the vehicle ahead 10. FIG. 4 shows a data structure of the second traveling information transmitted from the vehicle ahead 10. The braking information represents information indicating that braking occurs in the vehicle ahead 10 but may be information indicating that braking does not occur in the vehicle ahead 10. The position information represents current position information acquired from the sensor 40. Further, the traveling orientation information represents current traveling orientation information acquired from the sensor 40. In other words, the position information and the traveling orientation information indicate the current position and traveling orientation of the vehicle ahead 10. The control device 42 extracts, from the storage unit 44, the position information over an interval of 200-300 m from the current position and generates the traveling track information by aggregating the extracted position information in the sequence of time of acquisition. The traveling track information is also included in the second traveling information. The control device 42 outputs the second traveling information to the communication device 48.

Meanwhile, when notified by the braking detection unit 46 of the detection of braking, the control device 42 stores, as braking information, information indicating that braking has occurred in the vehicle ahead 10. Further, the control device 42 stores, as position information, the position information acquired from the sensor 40 at a point of time close to the point of time when the control device 42 is notified by the braking detection unit 46 of the detection of braking. Further, the control device 42, stores, as traveling orientation information, the traveling orientation information acquired from the sensor 40 at a point of time close to the point of time when the control device 42 is notified by the braking detection unit 46 of the detection of braking. In other words, the position information and the traveling orientation information indicate the position and the traveling orientation occurring when the vehicle ahead 10 is braked. The control device 42 extracts, from the storage unit 44, the position information over an interval of 200-300 m from the position where the vehicle ahead 10 is braked to generate the traveling track information by aggregating the extracted position information in the order of time of acquisition. The traveling track information is also included in the second traveling information. Reference is made back to FIG. 3. The control device 42 outputs the second traveling information to the communication device 48.

The communication device 48 is a wireless device compatible with vehicle-to-vehicle communication. The communication device 48 is also compatible with road-to-vehicle communication, but a description thereof is omitted. The communication device 48 receives the second traveling information from the control device 42. The communication device 48 generates a packet signal including the second traveling information and broadcasts the packet signal. The communication device 48 periodically broadcasts the packet signal for a predetermined duration (e.g., 10 msec). The communication device 48 may divide the second traveling information and include the respective blocks in separate packet signals.

The sensor 70 of the vehicle 60 is configured in a manner similar to that of the sensor 40. The first acquisition unit 80 acquires the information from the sensor 70 as the first traveling information. The sensor 70 outputs the first traveling information to the first acquisition unit 80. The communication device 72 is configured in a manner similar to that of the communication device 48 and receives the packet signal from the communication device 48. As mentioned above, the packet signal includes the second traveling information on the vehicle ahead 10, and the communication device 72 extracts the second traveling information from the packet signal. The communication device 72 outputs the second traveling information to the second acquisition unit 82.

The second acquisition unit 82 receives the second traveling information from the communication device 72. Therefore, the second acquisition unit 82 acquires the second information on the vehicle ahead 10. As mentioned above, the second traveling information includes the braking information on the vehicle ahead 10, the position information on the vehicle ahead 10, the traveling orientation information on the vehicle ahead 10, and the traveling track information on the vehicle ahead 10. In the case the braking information on the vehicle ahead 10 included in the acquired second traveling information indicates that braking occurs in the vehicle ahead 10, the first acquisition unit 80 receives the first traveling information from the sensor 70 at a point of time when the second acquisition unit 82 receives the second traveling information. Therefore, the first acquisition unit 80 acquires at least the position information and the traveling orientation information on the vehicle 60 occurring at a point of time when braking occurs in the vehicle ahead 10.

It is assumed here that the vehicle ahead 10 has the same traveling orientation as the vehicle 60, as shown in FIGS. 1A-1C, and is traveling in front of the vehicle 60. However, the communication device 72 may receive a packet signal including the second traveling information from a vehicle other than the vehicle ahead 10. To select the second traveling information from the vehicle ahead 10 from among such second traveling information, the acquisition unit 78 performs the following step. The acquisition unit 78 creates a vector directed from the position information on the vehicle 60 to the traveling orientation information and creates an area having a certain width from the vector. Subsequently, the acquisition unit 78 selects the second traveling information in which the position information is included in that area. This is a process to select the second traveling information from other vehicles traveling in front of the vehicle 60. Further, of the second traveling information selected, the acquisition unit 78 selects the second traveling information including the traveling orientation information not so much different from the traveling orientation information on the vehicle 60. In this case, the range of selection is defined to exclude the second traveling information on oncoming vehicles. The second traveling information thus selected represents the second traveling information from the vehicle ahead 10. The acquisition unit 78 outputs the selected second traveling information and the concurrent first traveling information to the determination unit 84 and the processing unit 86.

The determination unit 84 receives the first traveling information and the second traveling information from the acquisition unit 78. The determination unit 84 derives a distance between the position information in the second traveling information and the position information in the first traveling information. This is equivalent to deriving a distance between the vehicle ahead 10 and the vehicle 30 occurring when braking has occurred in the vehicle ahead 10. Further, a predetermined range (e.g., 100 m) is predefined in the determination unit 84. When the distance is within the predetermined range, the determination unit 84 selects the first threshold value. When the distance is greater than the predetermined range, the determination unit 84 selects the second threshold value. The first threshold value is defined to cover the width of the traveling lane and the width of the adjacent lane, which could be on either side. Further, the second threshold value is defined to cover the width of the traveling lane. In other words, the larger the distance, the smaller the threshold value, which generically refers to the first threshold value and the second threshold value. The smaller the distance, the larger the threshold value. In this way, the determination unit 84 determines the threshold value based on the second traveling information acquired by the second acquisition unit 82 and the first traveling information acquired by the first acquisition unit 80. The determination unit 84 outputs the first threshold value or the second threshold value to the processing unit 86.

The processing unit 86 receives the first traveling information and the second traveling information from the acquisition unit 78. Further, the processing unit 86 receives the first threshold value or the second threshold value corresponding to the traveling information from the determination unit 84. Of the plurality of pieces of position information included in the traveling track information in the second traveling information, the processing unit 86 selects the position information closest to the position information in the first traveling information and the position information adjacent to the position information thus selected. A publicly known technology may be used for selection of the position information. The processing unit 86 compares the minimum distance (distance T) between the line connecting the selected position information (hereinafter, "position information in traveling track information") and the position information in the first traveling information with the first threshold value or the second threshold value received. For clarity of the description, the first threshold value or the second threshold value will simply be referred to as "threshold value". When the distance T is equal to or smaller than the threshold value, the processing unit 86 determines to give a notification of braking. When the distance T is larger than the threshold value, the processing unit 86 determines not to give a notification of braking. Thus, the processing unit 86 determines to give or not to give a notification of braking in the further vehicle depending on the relationship between the distance T and the threshold value T.

Figure 5:
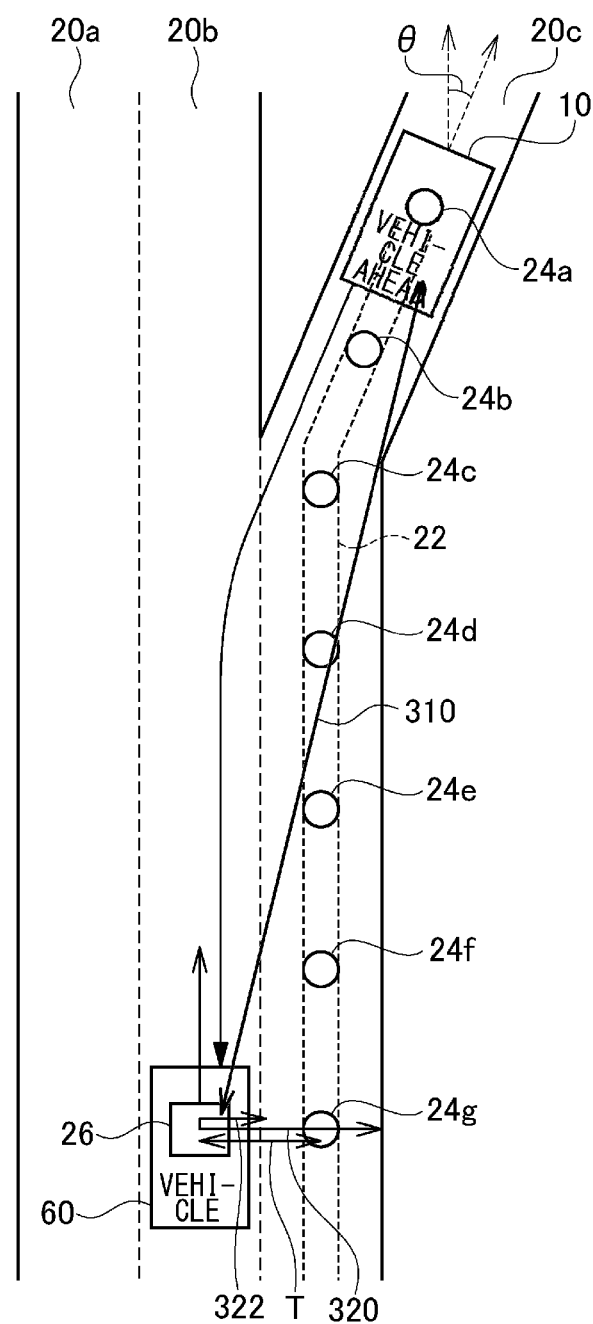
FIG. 5 shows an operation of the notification system of FIG. 3.

The output unit 88 outputs a notification of braking to the notification device 76 in accordance with the determination by the processing unit 86. In other words, when the distance T is equal to or smaller than the threshold value, the output unit 88 outputs a notification of braking. When the distance T is larger than the threshold value, the output unit 88 does not output a notification of braking. FIG. 5 will be used to explain the process described above in further detail.

FIG. 5 shows an operation of the notification system 100. FIG. 5 is an illustration similar to FIG. 2, and the vehicle ahead 10, the traveling track 22, and the position information 24 are as shown in FIG. 2. The vehicle 60 travels in the same position as the vehicle 30 of FIG. 2. The determination unit 84 derives a distance 310 between the first position information 24a on the vehicle ahead 10 and the position information 26 on the vehicle 60. When the distance 310 is equal to or smaller than a predetermined range, the determination unit 84 selects a first threshold value 320 as the threshold value. When the distance 310 is longer than the predetermined range, the determination unit 84 selects the second threshold value 322. For clear illustration, the first threshold value 320 and the second threshold value 322 are illustrated as being defined to the right of the position information 26 only, but the threshold values are equally defined to the left thereof. The distance 310 may be a linear distance between the vehicle 60 and the vehicle ahead 10. Alternatively, the distance 310 may be the traveling distance ahead (driving distance) based on the track of traveling of the vehicle ahead 10 between the vehicle 60 and the vehicle ahead 10.

Of the plurality of pieces of position information 24 included in the traveling orientation information, the processing unit 86 selects the seventh position information 24g closest to the position information 26 on the vehicle 60 and the adjacent sixth position information 24f. The processing unit 86 also calculates the minimum distance (distance T) from the position information 26 to the straight line connecting the seventh position information 24g and the sixth position information 24f. When the calculated distance T is equal to or smaller than the first threshold value 320 or the second threshold value 322, the processing unit 86 notifies the driver of the vehicle 60 of braking in the vehicle ahead 10. Meanwhile, when the distance T is larger than the first threshold value 320 or the second threshold value 322, the processing unit 86 does not notify the driver of the vehicle 60 of braking in the vehicle ahead 10. Therefore, when the first threshold value 320 is selected, the vehicle 60 gives a notification of braking in the vehicle ahead 10, but, when the second threshold value 322 is selected, the vehicle 60 does not give a notification of braking in the vehicle ahead 10. Reference is made back to FIG. 3.

Figure 6:
FIG. 6 shows a screen displayed on the notification device of FIG. 3.

The notification device 76 is a display device such as a liquid crystal display (LCD) or the like and displays a screen for giving a notification of braking in the vehicle ahead 10 upon receipt of a notification of braking from the output unit 88. FIG. 6 shows a screen displayed on the notification device 76. As shown in the figure, a message for giving a notification of braking in the vehicle ahead 10 is shown. Reference is made back to FIG. 3. The notification device 76 is a light emitting diode (LED) or the like and may be lighted when receiving a notification of braking from the output unit 88. The notification device 76 may be a speaker and may output sound to give a notification of braking in the vehicle ahead 10 upon receipt of a notification of braking from the output unit 88. The notification device 76 may use two or more of these measures to give a notification of braking.

The determination unit 84 is described above as determining the threshold value based on the distance 310 between the position information in the second traveling information and the position information in the first traveling information, but the manner of determining the threshold value is not limited to the one described. A description will now be given of an alternative process in the determination unit 84. The determination unit 84 derives a difference between the traveling orientation information in the second traveling information and the traveling orientation information in the first traveling information. This is equivalent to deriving a difference in traveling orientation between the vehicle ahead 10 and the vehicle 30 occurring when braking occurs in the vehicle ahead 10.

Further, a predetermined range of, for example, 10° is predefined in the first acquisition unit 80. When the difference is within the predetermined range, the determination unit 84 selects the first threshold value, and when the difference is larger than the predetermined range, the determination unit 84 selects the second threshold value. The first threshold value and the second threshold value are as described above, and a description thereof is omitted. In other words, the larger the difference, the smaller the threshold value, which generically refers to the first threshold value and the second threshold value. The smaller the difference, the larger the threshold value. The determination unit 84 outputs the first threshold value or the second threshold value to the processing unit 86. Referring to FIG. 5, the vehicle 60 is traveling in an orientation straight upward as indicated by the arrow, and the traveling orientation in this case is defined to be 0°. Further, the traveling orientation of the vehicle ahead 10 is denoted by θ. Therefore, the difference is represented by θ.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only or by a combination of hardware and software.

Figure 7:
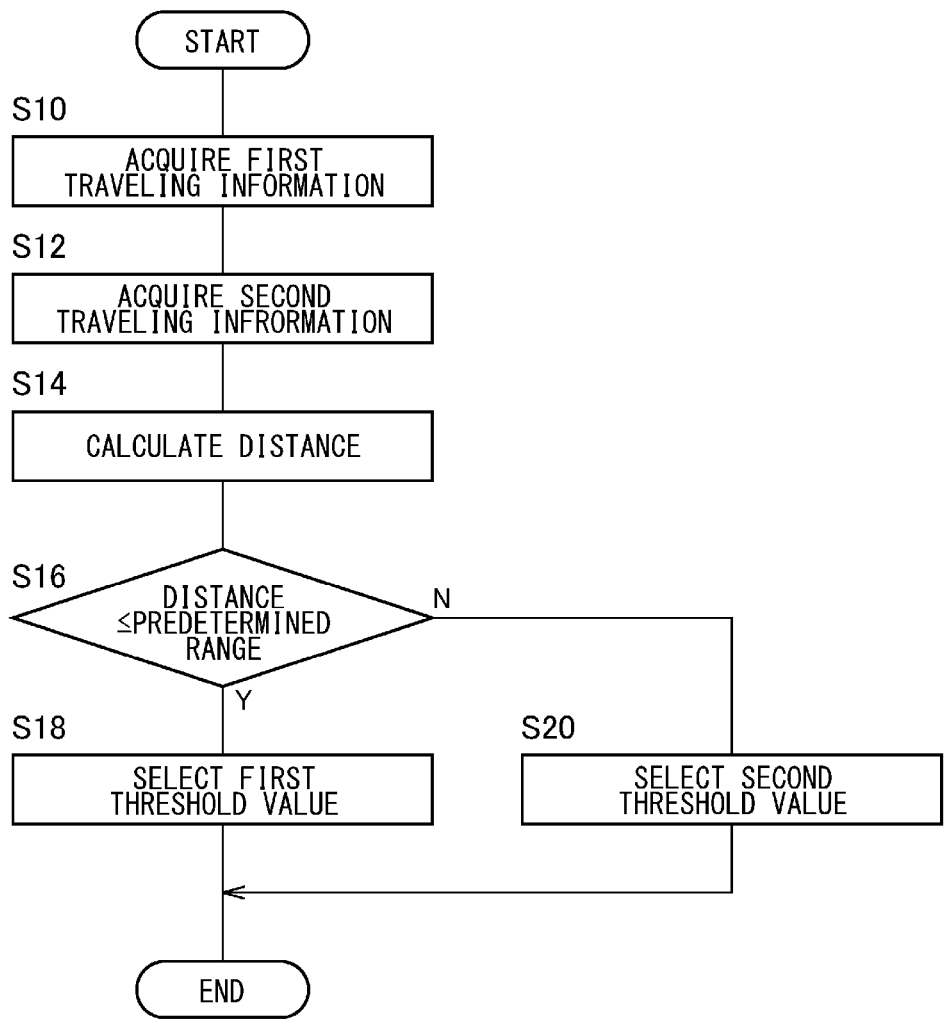
FIG. 7 is a flowchart showing steps of notification performed in the vehicle of FIG. 3.

A description will now be given of an operation of the vehicle 60 configured as described above. FIG. 7 is a flowchart showing steps of notification performed in the vehicle 60. The first acquisition unit 80 acquires the first traveling information on the vehicle 60 (S10). The second acquisition unit 82 acquires the second traveling information on the vehicle ahead 10 (S12). The determination unit 84 calculates a distance between the vehicle ahead 10 and the vehicle 60 occurring when the vehicle ahead 10 is braked, based on the first traveling information and the second traveling information (S14). When the distance is equal to or smaller than a predetermined range (Y in S16), the determination unit 84 selects the first threshold value (S18). When the distance is not equal to or smaller than the predetermined range (N in S16), the determination unit 84 selects the second threshold value (S20).

Figure 8:
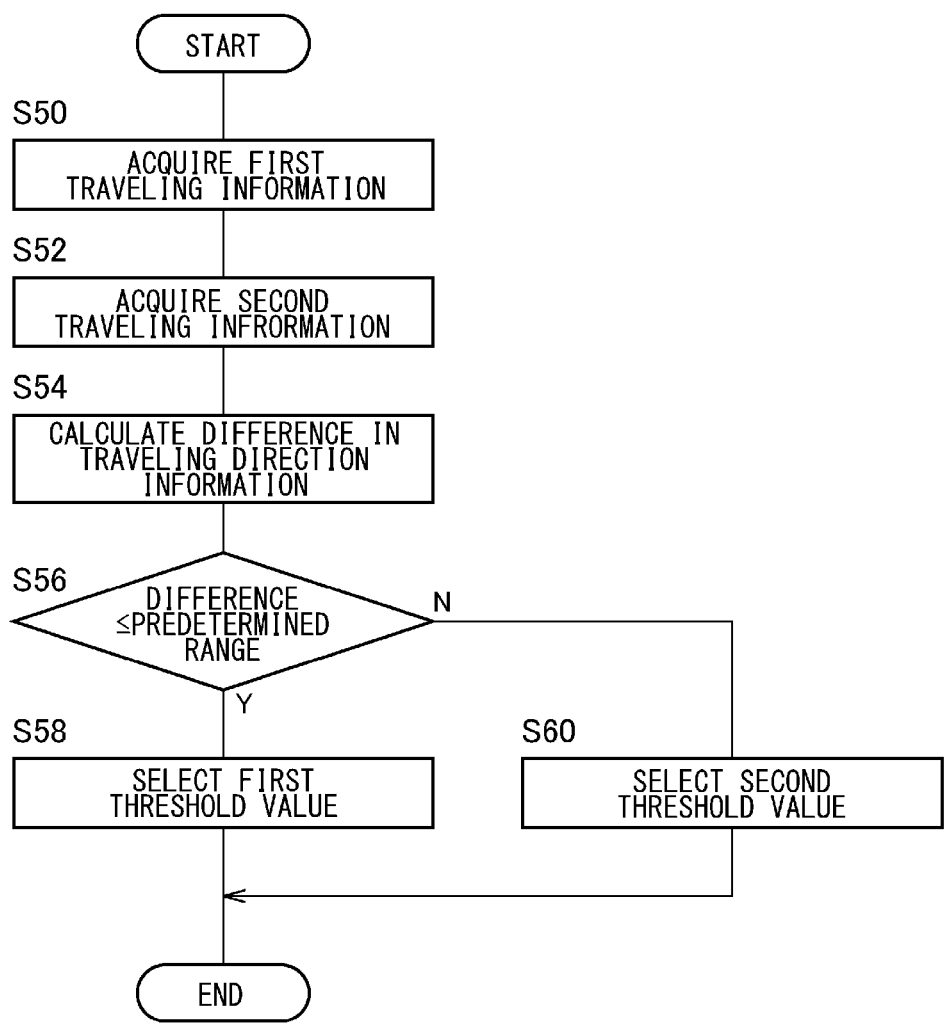
FIG. 8 is a flowchart showing alternative steps of notification performed in the vehicle of FIG. 3.

FIG. 8 is a flowchart showing alternative steps of notification performed in the vehicle 60. The first acquisition unit 80 acquires the first traveling information on the vehicle 60 (S50). The second acquisition unit 82 acquires the second traveling information on the vehicle ahead 10 (S52). The determination unit 84 calculates a difference $\theta$ between the traveling orientation of the vehicle ahead 10 and the traveling orientation of the vehicle 60 occurring when the vehicle ahead 10 is braked, based on the first traveling information and the second traveling information (S54). When the difference $\theta$ is equal to or smaller than a predetermined range (Y in S56), the determination unit 84 selects the first threshold value (S58). When the difference $\theta$ is not equal to or smaller than a predetermined range (N in S56), the determination unit 84 selects the second threshold value (S60).

According to the embodiment of the present disclosure, a notification of braking in the vehicle ahead is given or not given by using the threshold value determined based on the first traveling information and the second traveling information. Therefore, occurrence of unnecessary notifications of braking in the vehicle ahead is inhibited. Since occurrence of unnecessary notifications of braking in the vehicle ahead is inhibited, the driver's attention is prevented from being less attracted due to frequent notifications. Further, since the threshold value is determined based on the first traveling information and the second traveling information, a necessary notification of braking in the vehicle ahead is given while, at the same time, occurrence of unnecessary notifications is inhibited. Further, the threshold value is determined such that the larger the distance between the vehicle ahead and the vehicle, the smaller the threshold value, and, the smaller the distance, the larger the threshold value. Therefore, the accuracy of the threshold value is improved. Further, the threshold value is determined such that the larger the difference in traveling orientation between the vehicle ahead and the vehicle, the smaller the threshold value, and, the smaller the difference, the larger the threshold value. Therefore, the accuracy of the threshold value is improved. Further, a notification of braking is given when the distance is equal to or smaller than the threshold value, and a notification of braking is not given when the distance is larger than the threshold value. Therefore, occurrence of unnecessary notifications is inhibited.

One embodiment of the present disclosure is summarized below. A control device according to an embodiment of the present disclosure can be mounted on a vehicle and includes: a first acquisition unit that acquires first traveling information at least including position information on a host vehicle; a second acquisition unit that acquires second traveling information at least including traveling track information on a further vehicle when braking occurs in the further vehicle; a determination unit that determines a threshold value based on the second traveling information acquired by the second acquisition unit and the first traveling information acquired by the first acquisition unit; and an output unit that gives a notification of braking in the further vehicle in accordance with a relationship between a distance and the threshold value determined by the determination unit, the distance being defined between the traveling track information in the second traveling information acquired by the second acquisition unit and the position information in the first traveling information acquired by the first acquisition unit.

According to this embodiment, a notification of braking in the further vehicle is given or not given by using the threshold value determined based on the first traveling information and the second traveling information. Accordingly, occurrence of unnecessary notifications of braking in the further vehicle is inhibited.

The second traveling information acquired by the second acquisition unit may include position information on the further vehicle, and the determination unit may determine the threshold value such that the larger the distance between the position information in the second traveling information acquired by the second acquisition unit and the position information in the first traveling information acquired by the first acquisition unit, the smaller the threshold value, and the smaller the distance, the larger the threshold value. In this case, since the threshold value is determined such that the larger the distance between the further vehicle and the host vehicle, the smaller the threshold value, and the smaller the distance, the larger the threshold value, the accuracy of the threshold value is improved.

The first traveling information acquired by the first acquisition unit may include traveling orientation information on the host vehicle, the second traveling information acquired by the second acquisition unit may include traveling orientation information on the further vehicle, and the determination unit may determine the threshold value such that the difference between the traveling orientation information in the second traveling information acquired by the second acquisition unit and the traveling orientation information in the first traveling information acquired by the first acquisition unit, the smaller the threshold value, and the smaller the difference, the larger the threshold value. In this case, since the threshold value is determined such that the larger the difference in traveling orientation between the further vehicle and the host vehicle, the smaller the threshold value, and, the smaller the difference, the larger the threshold value. Therefore, the accuracy of the threshold value is improved.

The output unit may give a notification of braking when the distance is equal to or smaller than the threshold value and may not give a notification of braking when the distance is larger than the threshold value. In this case, since a notification of braking is given when the distance is equal to or smaller than the threshold value and a notification of braking is not given when the distance is larger than the threshold value, occurrence of unnecessary notifications is inhibited.

The output unit may change a mode of notification depending on whether the distance is equal to or smaller than the threshold value. In this case, the driver is allowed to recognize whether notification is important or not important.

Another embodiment of the present disclosure relates to a control method. The method is adapted to a control device that can be mounted on a vehicle and includes: acquiring first traveling information at least including position information on a host vehicle; acquiring second traveling information at least including traveling track information on a further vehicle when braking occurs in the further vehicle; determining a threshold value based on the second traveling information acquired and the first traveling information acquired; and giving a notification of braking in the further vehicle in accordance with a relationship between a distance and the threshold value determined, the distance being defined between the traveling track information in the second traveling information acquired and the position information in the first traveling information acquired.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

The determination unit 84 according to the embodiment determines the threshold value based on the distance between the vehicle ahead 10 and the vehicle 60 or the difference in traveling orientation between the vehicle ahead 10 and the vehicle 60. Alternatively, the determination unit 84 may determine the threshold value based on the difference in altitude between the vehicle ahead 10 and the vehicle 60. In that case, information related to the altitude is included in the second traveling information. According to this variation, the flexibility in the configuration is improved.

The processing unit 86 and the output unit 88 of the embodiment gives a notification when the distance T between the position information in the second traveling information acquired by the second acquisition unit 82 and the position information in the first traveling information acquired by the first acquisition unit 80 is equal to or smaller than the threshold value (the first threshold value or the second threshold value) and does not give a notification when the distance T is larger than the threshold value. Alternatively, the processing unit 86 and the output unit 88 may modify the mode of notification depending on whether the distance T is equal to or smaller than the threshold value. Specifically, a notification may be given in the form of screen display and output of sound when the distance T is equal to or smaller than the threshold value, and a notification may be given only in the form of screen display when the distance T is larger than the threshold value. In this case, a notification that can be noticed by the driver more easily is given when the distance T is equal to or smaller than the threshold value than when the distance T is larger than the threshold value T. Further, given that the threshold value determined by the determination unit 84 is the second threshold value, the mode of notification may be changed depending on whether 1) the distance T is equal to or smaller than the second threshold value, 2) the distance T is larger than the second threshold value and equal or smaller than the first threshold value, and 3) the distance T is larger than the first threshold value. According to this variation, the driver is allowed to recognize whether notification is important or not important.

The vehicle ahead 10 according to the embodiment generates, in the control device 42, the second traveling information including the braking information (in particular, the information indicating that braking occurs in the vehicle ahead 10) and broadcasts, in the communication device 48, the packet signal including the second traveling information. Alternatively, however, the vehicle ahead 10 may generate, in the control device 42, the second traveling information including the speed or the acceleration of the vehicle ahead 10 in place of the braking information and may broadcast, in the communication device 48, the packet signal including the resultant second traveling information. In this case, the vehicle 60 determines whether braking has occurred in the vehicle ahead 10 based on the information related to the information on the speed or the acceleration included in the acquired second traveling information on the vehicle ahead 10. According to this variation, the flexibility in the configuration is improved.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No. 2017-137358, filed on Jul. 13, 2017, the entire contents of which are incorporated herein by reference.

What is claimed is:

1. A control device that can be mounted on a vehicle, comprising:
    a first acquisition unit that acquires first traveling information at least including position information on a host vehicle;
    a second acquisition unit that acquires second traveling information at least including traveling track information on a further vehicle when braking occurs in the further vehicle;
    a determination unit that determines a threshold value based on the second traveling information acquired by the second acquisition unit and the first traveling information acquired by the first acquisition unit; and
    an output unit that gives a notification of braking in the further vehicle in accordance with a relationship between a distance and the threshold value determined by the determination unit, the distance being defined between the traveling track information in the second traveling information acquired by the second acquisition unit and the position information in the first traveling information acquired by the first acquisition unit.

2. The control device according to claim 1, wherein
    the second traveling information acquired by the second acquisition unit includes position information on the further vehicle, and
    the determination unit determines the threshold value such that the larger the distance between the position information in the second traveling information acquired by the second acquisition unit and the position information in the first traveling information acquired by the first acquisition unit, the smaller the threshold value, and the smaller the distance, the larger the threshold value.

3. The control device according to claim 2, wherein the output unit gives the notification of braking when the distance is equal to or smaller than the threshold value and does not give a notification of braking when the distance is larger than the threshold value.

4. The control device according to claim 2, wherein
the output unit changes a mode of notification depending on whether the distance is equal to or smaller than the threshold value.

5. The control device according to claim 1, wherein
the first traveling information acquired by the first acquisition unit includes traveling orientation information on the host vehicle,
the second traveling information acquired by the second acquisition unit includes traveling orientation information on the further vehicle, and
the determination unit determines the threshold value such that the difference between the traveling orientation information in the second traveling information acquired by the second acquisition unit and the traveling orientation information in the first traveling information acquired by the first acquisition unit, the smaller the threshold value, and the smaller the difference, the larger the threshold value.

6. The control device according to claim 5, wherein the output unit gives the notification of braking when the distance is equal to or smaller than the threshold value and does not give a notification of braking when the distance is larger than the threshold value.

7. The control device according to claim 5, wherein
the output unit changes a mode of notification depending on whether the distance is equal to or smaller than the threshold value.

8. The control device according to claim 1, wherein the output unit gives the notification of braking when the distance is equal to or smaller than the threshold value and does not give a notification of braking when the distance is larger than the threshold value.

9. The control device according to claim 1, wherein
the output unit changes a mode of notification depending on whether the distance is equal to or smaller than the threshold value.

10. A control method in a control device that can be mounted on a vehicle, the method comprising:
acquiring first traveling information at least including position information on a host vehicle;
acquiring second traveling information at least including traveling track information on a further vehicle when braking occurs in the further vehicle;
determining a threshold value based on the second traveling information acquired and the first traveling information acquired; and
giving a notification of braking in the further vehicle in accordance with a relationship between a distance and the threshold value determined, the distance being defined between the traveling track information in the second traveling information acquired and the position information in the first traveling information acquired.

* * * * *